US012645423B2

(12) United States Patent　　　(10) Patent No.:　US 12,645,423 B2

Granlund　　　(45) Date of Patent:　　Jun. 2, 2026

(54) APPARATUS, METHOD AND COMPUTER PROGRAM PRODUCT FOR PROVIDING AUDIO GUIDANCE DURING EXERCISE

(71) Applicant: Polar Electro Oy, Kempele (FI)

(72) Inventor: Tommy Granlund, Kempele (FI)

(73) Assignee: Polar Electro Oy, Kempele (FI)

( * ) Notice: Subject to any disclaimer, the term of this patent is extended or adjusted under 35 U.S.C. 154(b) by 185 days.

(21) Appl. No.: 18/718,934

(22) PCT Filed: Dec. 19, 2022

(86) PCT No.: PCT/FI2022/050847

§ 371 (c)(1),
(2) Date: Jun. 12, 2024

(87) PCT Pub. No.: WO2023/118654

PCT Pub. Date: Jun. 29, 2023

(65) Prior Publication Data

US 2025/0045012 A1　　Feb. 6, 2025

(30) Foreign Application Priority Data

Dec. 23, 2021　　(EP) ..................................... 21217524

(51) Int. Cl.
　*G06F 3/16*　　　(2006.01)
　*A63B 24/00*　　(2006.01)
　*G01C 21/36*　　(2006.01)
(52) U.S. Cl.
　CPC .......... *G06F 3/165* (2013.01); *A63B 24/0021* (2013.01); *G01C 21/3629* (2013.01)
(58) Field of Classification Search
　CPC ... G06F 3/16; G06F 3/165; A61B 5/00; A61B 5/024; A63B 22/00; A63B 24/0021;
(Continued)

(56) References Cited

U.S. PATENT DOCUMENTS 10,484,737 B2 *　11/2019　Hiremath ............... H04N 21/84
12,515,312 B2 *　 1/2026　Robison ................. B25J 9/0006
(Continued)

FOREIGN PATENT DOCUMENTS

| EP | 3158928 A1 | 4/2017 |
|---|---|---|
| JP | 5243679 B2 | 4/2013 |
| WO | 2023118654 A1 | 6/2023 |

OTHER PUBLICATIONS

International Search Report and Written Opinion Received for International Application No. PCT/FI2022/050847, dated May 15, 2023, 28 pages.

(Continued)

*Primary Examiner* — Andrew Joseph Rudy
(74) *Attorney, Agent, or Firm* — FisherBroyles, LLP

(57)　　　　ABSTRACT

An apparatus, a method and a computer program product for providing audio guidance during exercise are disclosed. The apparatus comprises one or more sensors to measure sensor data related to an exercise session of a user; a loudspeaker; and one or more processors to cause performance of operations comprising: receiving the sensor data measured during the exercise session from the one or more sensors; playing an audio stream via the loudspeaker to the user during the exercise session; generating an audio guidance message based on the sensor data; determining a future time instant during a future playing period of the audio stream for outputting the audio guidance message; and interrupting the playing of the audio stream at the future time instant and outputting the audio guidance message via the loudspeaker to the user.

18 Claims, 4 Drawing Sheets

(58) Field of Classification Search
CPC ...... G01C 21/3629; G16H 20/30; H04R 1/10;
G96F 3/16; G10L 19/00
USPC ........................................................ 701/428
See application file for complete search history.

(56) References Cited

U.S. PATENT DOCUMENTS

| | | |
|---|---|---|
| 2010/0059561 A1 | 3/2010 | Ellis et al. |
| 2017/0061817 A1 | 3/2017 | Mettler May |
| 2017/0346872 A1 | 11/2017 | Naik et al. |
| 2018/0301220 A1 | 10/2018 | Rothman |
| 2019/0246973 A1 | 8/2019 | Constantin et al. |

OTHER PUBLICATIONS

Extended European Search Report Received for European Application No. 21217524.4, dated Jun. 27, 2022, 12 pages.

* cited by examiner

FIG. I

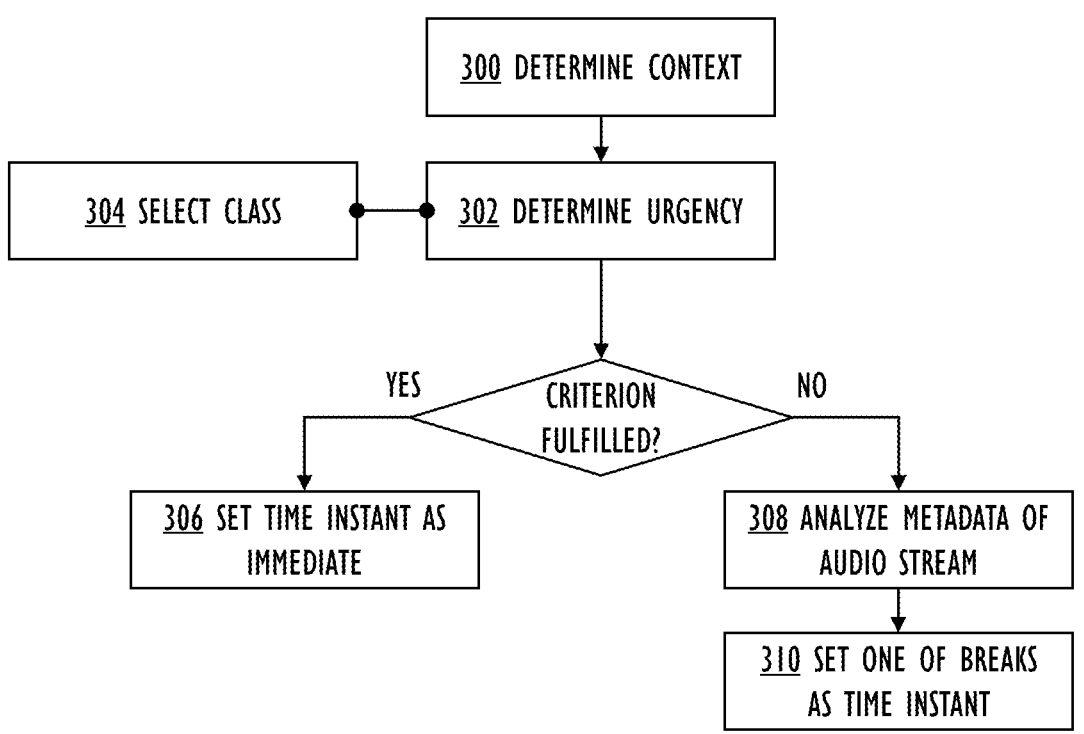
FIG. 3
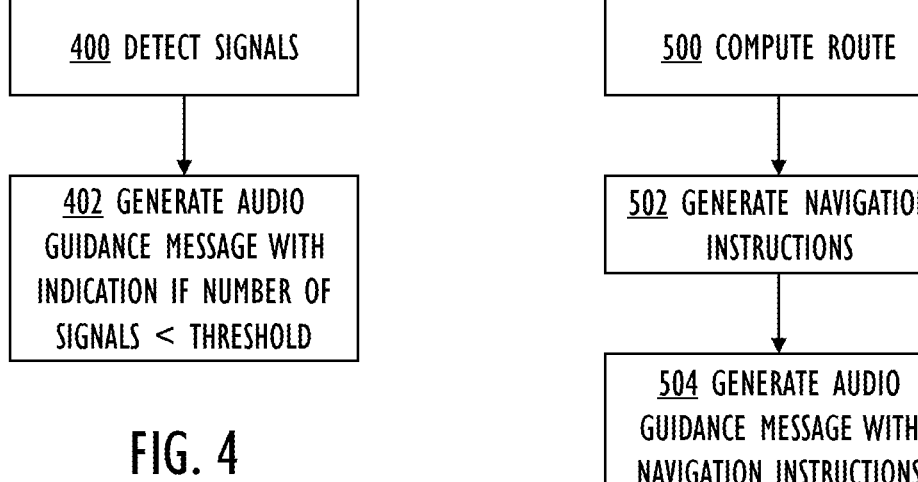
FIG. 4
FIG. 5

APPARATUS, METHOD AND COMPUTER PROGRAM PRODUCT FOR PROVIDING AUDIO GUIDANCE DURING EXERCISE

CROSS-REFERENCE TO RELATED APPLICATIONS

This application is a national phase application of International Application No. PCT/FI2022/050847, which claims benefit and priority to European Application No. 21217524.4, filed Dec. 23, 2021, which are incorporated by reference herein in their entireties.

BACKGROUND

Field

Various embodiments relate to an apparatus, method and computer program product for providing audio guidance during exercise.

SUMMARY

A person carrying out physical exercise may greatly benefit from guidance provided by a coach or a device during the exercise. The guidance may be related to performing the exercise, for example. A device for providing guidance during exercise may be carried by a user of the device so that the device may provide audio guidance to the user at any time during the exercise. During the physical exercise, the user may play an audio stream in the form of music tracks or an audiobook, for example. It would be beneficial to efficiently interleave or mix the audio guidance with the playback of the audio stream.

According to an aspect, there is provided subject matter of independent claims. Dependent claims define some embodiments.

One or more examples of implementations are set forth in more detail in the accompanying drawings and the description of embodiments.

BRIEF DESCRIPTION OF THE DRAWINGS

Some embodiments will now be described with reference to the accompanying drawings, in which

FIGS. 2, 3, 4, and 5 illustrate embodiments of a method;

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
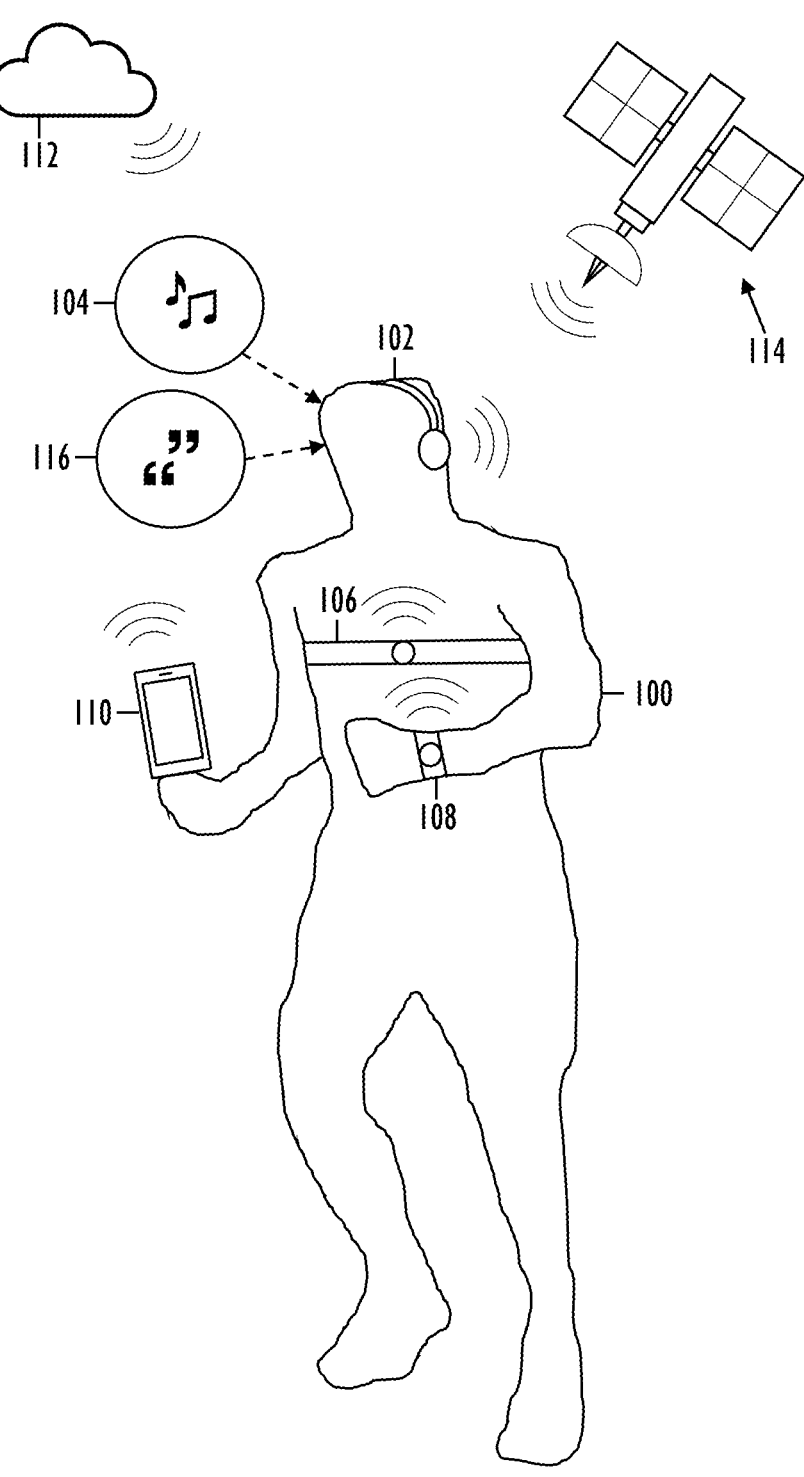
FIG. 1 illustrates embodiments of an apparatus.

FIG. 1 illustrates embodiments of an apparatus for providing audio guidance during exercise, as well as a scenario to which the embodiments may be applied. A user 100 performing physical exercise during an exercise session may consume audio content, such as an audio stream 104, during the exercise session. The apparatus comprises a loudspeaker, such as headphones 102, for playing the audio stream to the user via the loudspeaker. The loudspeaker may alternatively be integrated to a wrist device 108 worn by the user on their wrist, or to a portable electronic device 110 carried by the user, for example. The apparatus further comprises one or more sensors configured to measure sensor data during the exercise session. The one or more sensors may be integrated to the headphones 102, a heart rate monitor belt 106, the wrist device 108, and/or the portable electronic device 110, for example.

The apparatus of may be a single physical apparatus or a distributed apparatus. For example, the wrist device 108 may operate as the single physical apparatus. The distributed apparatus may comprise a plurality of communicatively coupled physical devices such as the headphones 102, the heart rate monitor belt 106, the wrist device 108, and/or the portable electronic device 110.

The one or more sensors may comprise one or more of the following: one or more heart activity sensors, one or more motion sensors, one or more location sensors, one or more swimming sensors, one or more power sensors, one or more bike sensors, and/or one or more temperature sensors.

The heart activity sensors may be configured to determine heart activity, such as heart rate, heart beat interval (HBI) and/or heart rate variability (HRV), for example. The heart activity sensors include, but are not limited to, a cardiovascular sensor (such as an electrocardiogram (ECG) sensor), an optical heart activity sensor such as a photoplethysmography (PPG) sensor, or a bioimpedance plethysmography. The optical heart activity sensor may detect the heart activity of the user by optical heart rate measurement, which may comprise sending a light beam towards skin of the user and measuring the bounced and/or emitted light from the skin of the user. The light beam may alter when travelling through veins of the user and the alterations may be detected by the optical heart rate activity sensor. The ECG sensor may be integrated to the heart rate monitor belt 106, and the PPG sensor to the wrist device 108, for example. Further, besides these types of heart activity sensors, other types of biosignal measurement sensors may be embedded into the heart activity sensors. These types include but are not limited to the following: a Laser Doppler-based blood flow sensor, a magnetic blood flow sensor, an electromechanical film (EMFi) pulse sensor, a polarization blood flow sensor. In an embodiment, the heart activity sensor may produce raw sensor data of the heart activity and/or it may process the sensor data into heart activity information, such as heart rate, for example.

Motion sensors may be configured to measure motion induced by the user to the apparatus by moving their hands, chest, head, or other body parts to which the motion sensor attached to. The motion sensor may use other motion data, such as location data of the user, to determine motion of the user. In an example embodiment, the motion sensor comprises at least one of the following: an accelerometer, a magnetometer, and a gyroscope. The motion sensor may further comprise sensor fusion software for combining the accelerometer data and gyroscope data so as to provide physical quantities, such as acceleration data, velocity data, or limb trajectory data in a reference coordinate system having orientation defined by a predetermined gyroscope orientation.

Location sensors may utilize a global navigation satellite system (GNSS) or other satellite-based, or radio system-based system for locating the user and measuring various parameters (speed, distance, location, route) relating to the movement of the user.

Swimming sensors may measure swimming specific parameters such as number of strokes or distance, for example.

Bike sensors may be sensors attached to various parts of the bike for measuring speed, cadence, or power, for example.

The sensor data measured by the sensors, or determined by the apparatus on the basis of the sensor data, may comprise: heart rate zones, heart rate samples, heart rate variation samples, heart beat interval samples, fat consumption rate, calorie consumption rate, consumed amount of calories, activity zones, activity samples, speed and/or pace samples, power samples, cadence samples, altitude samples, temperature samples, location samples, distance elapsed, time elapsed, pedal index, left-right balance, running index, training load, galvanic skin response samples, fluid balance, skin temperature samples, heading samples and/or bike angles. The location data may comprise satellite positioning data, such as, GNSS positioning data, or any other data that allows the determination of the location of the user during the exercise at any given time. Movement indoors may be detected via indoor location tracking methods, such as mapping techniques including measuring Earth's magnetic fields or radio frequency signals.

The loudspeaker converts an electrical audio signal of the audio stream 104 and/or an audio guidance message 116 to a corresponding sound. The state-of-the-art knows several implementations of such loudspeakers so more detailed description is omitted. However, it is noted that the loudspeaker may include loudspeakers that convey the sound to the user's ear canal through air, as well as through any other medium, such as the bones of the user's skull. The loudspeaker may comprise a plurality of loudspeakers, such as a first and second loudspeaker in the headphones 102, a third loudspeaker in the wrist device 108, and/or a fourth loudspeaker in the portable electronic device 110, for example.

The one or more sensors may generate sensor data during the physical exercise session performed by the user. The exercise session may be launched in the wrist device 108, and the wrist device 108 may control the one or more sensors described above to conduct measurements during the exercise session and to transmit the sensor data to the wrist device 108, to the portable electronic device 110 and/or to a (cloud) server 112 storing the user's user account. The server 112 may reside beyond one or more networks, including telecommunication and/or computer networks. The portable electronic device 110 may be a mobile phone, a smart phone, a palm device, a tablet computer, phablet or a portable digital assistant, for example. In some cases, the wrist device 108 may operate as a hub that collects the sensor data during the exercise and then synchronizes the sensor data with the portable electronic device 110 and/or the server 112. The wrist device 108, the portable electronic device 110 and/or the server 112 may comprise at least one processor configured to process the sensor data.

The one or more sensors, the wrist device 108, the portable electronic device 110 and/or the server 112 may each further comprise a communication circuitry, such as wireless communication circuitry, configured to enable sensor data transfer between the one or more sensors, wrist device 108, portable electronic device 110 and/or the server 112. The communication circuitry may employ suitable communication protocols such as Bluetooth® technology.

Further, the wrist device 108 and/or the portable electronic device 110 may comprise a memory, wherein the memory may be used by the devices to store the sensor data. The server 112 may use a database to store said sensor data. At least some of the contents of the database may be synchronized between the devices 108, 110, 112 so that relevant sensor data is available to carry out the embodiments described below.

Figure 2:
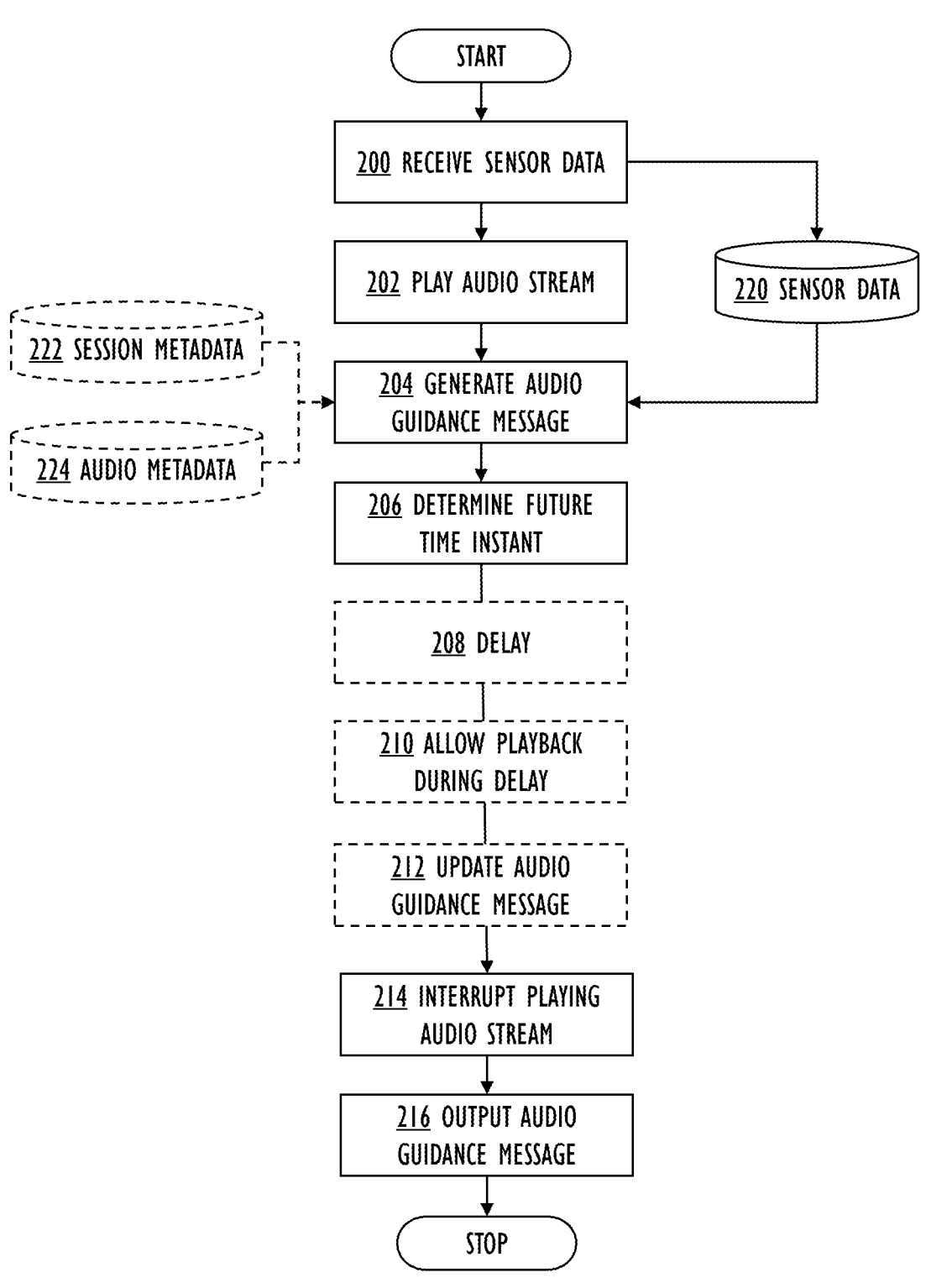

FIG. 2 illustrates a method for providing audio guidance to a user during an exercise session. The apparatus of FIG. 1 comprises one or more processors configured to carry out the method of FIG. 2. Referring to FIG. 2, the method comprises: receiving 200 sensor data 220 measured during an exercise session of a user from one or more sensors; playing 202 an audio stream via a loudspeaker to the user during the exercise session; generating 204 an audio guidance message based on the sensor data; determining 206 a future time instant during a future playing period of the audio stream for outputting the audio guidance message; and interrupting 214 the playing of the audio stream at the future time instant and outputting 216 the audio guidance message via the loudspeaker to the user.

A technical effect of the above is efficient mixing of the audio stream and the audio guidance message generated based on the sensor data.

The apparatus is configured to play the audio stream 104 to the user during the exercise session. Audio data for the audio stream may be stored in a memory of the apparatus, or the apparatus may receive the audio stream from e.g. a cloud server 112.

The audio guidance message 116 is generated based on the sensor data. The audio guidance message may comprise information related to parameters such as speed, power, heart rate, distance, duration, and/or calories spent during the exercise session. The audio guidance message may include one or more parameters derived from the above, such as average, maximum, or minimum values of the above, computed for the whole exercise session or for a subperiod or the whole exercise session. The audio guidance message may include one or more alerts, such as an alert related to battery status, navigation system status, hazardous substances, pollution, extreme weather, temperature, or ultraviolet (UV) radiation. The audio guidance message may include instructions, such as navigation instructions or instructions related to performing the exercise session.

The future playing period may refer to a time period starting from the time of said determining the future time instant. The future playing period may be finite. The future playing period may end some time after the time of said determining. The future playing period may end after the end of the exercise session, or it may end at the same time as the exercise session, or it may end before the end of the exercise session. Therefore, the future time instant may be before, at, or after the end of the exercise session. In an embodiment, the end of the future playing period is limited to the end of the exercise session. A benefit is that the audio stream is interrupted and the audio guidance message is output at the latest at the end of the exercise session, and the user is not left waiting after the end of the exercise session.

In an embodiment, the method comprises setting end of the exercise session as the future time instant. The end of the exercise session may be a suitable time for providing summary information related to the whole exercise session, such as total distance, duration, calories spent, average and/or maximum and/or minimum speed and/or heart rate during the whole exercise session.

In an embodiment, the method further comprises resuming the playing of the audio stream after outputting the audio guidance message.

The interrupting may comprise generating an artificial break in the audio stream. In an embodiment, the interrupting comprises pausing the playing of the audio stream. When the audio stream is paused, the user does not miss any of the content of the audio stream during the pausing. The pausing may be performed for the duration of the audio guidance message, or for a duration that is longer that the duration of the audio guidance message. In the former case, the length of the interruption to the audio stream may be minimized. In the latter case, the pause may begin a predetermined time before outputting the audio guidance message, providing the user some time to shift their attention from the audio stream to the upcoming audio guidance message. The pause may also extend for a predetermined time after the end of the audio guidance message, this time providing the user some time to shift their attention from the audio guidance message back to the audio stream.

Alternatively or additionally, the interrupting may comprise changing, preferably lowering, the volume of the audio stream. A benefit is that the user may continue to listen to the audio stream while also hearing the audio guidance message. The benefit is most useful when the audio stream is e.g. a live stream or other audio content that has been broadcast and is received by the apparatus in real time. Pausing such an audio stream may not be possible, or it may lead to loss of the content of audio stream for the duration of the interrupting such that said content may not be played to the user even after the interrupting. Alternatively, the method may comprise buffering the audio stream starting from the future time instant. In this case, the real-time property of the audio stream may be lost by the buffering.

In an embodiment, the one or more processors are configured to delay 208, after said determining, said outputting the audio guidance message and to allow 210 playback of the audio stream during said delay. The delay allows for waiting for a future time instant at which the user may better receive the audio guidance message, compared to the time before the future time instant. The user may also continue consuming the audio stream during the delay.

FIG. 3 illustrates an embodiment of the method comprising: determining 302 an urgency for the audio guidance message based on the contents of the audio guidance message; and if the urgency of the audio guidance message fulfils an urgency criterion, setting 306 the future time instant as immediate; else if the urgency of the audio guidance message does not fulfil the urgency criterion, analyzing 308 metadata of the audio stream to detect one or more upcoming breaks in the future playing period of the audio stream, and setting 310 one of the one or more upcoming breaks as the time instant. A technical effect is that audio guidance messages that are considered urgent may be immediately output to the user, and audio guidance messages that are not considered urgent may be delayed until a later time. The above-mentioned artificial break may be generated for the audio guidance message if it is considered urgent. Non-urgent audio guidance messages are delayed specifically to one of the one or more upcoming breaks in the future playing period of the audio stream. This utilizes the breaks that occur within the audio stream and reduces the need for manipulating the audio stream for outputting the audio guidance message. The one or more upcoming breaks may correspond to times when the audio stream is preferably interrupted as opposed to the time before and/or between the one or more upcoming breaks.

An upcoming break may be a transition from one track of the audio stream to the next track directly following said one track in a playlist of the audio stream. The track may correspond a song or a chapter of an audiobook, for example. The upcoming break may alternatively be a period of silence in the audio stream, e.g. during a track (optionally excluding periods of silence in the beginning and at the end of the track).

In an embodiment, the method comprises detecting an event on the basis of the sensor data, and generating contents of the audio guidance message that correspond to the detected event. Detecting the event may trigger generating the audio guidance message. With respect to the embodiment of FIG. 3, determining the urgency based on the contents of the audio guidance message may be performed as determining the urgency based on the detected event, as the contents of the audio guidance correspond to the detected event. The event may be related to the user's heart rate or speed exceeding or subceeding a defined target, a battery level decreasing below a threshold, a certain event in a plan for the exercise session, or the user arriving at a particular location, for example. Further examples of the event are described in more detail below.

An embodiment comprises setting the earliest of the one or more upcoming breaks as the future time instant. A benefit is that the delay in outputting the audio guidance message is minimized. In a case where there are multiple audio guidance messages pending for output, the multiple audio guidance messages may all be output during the same (earliest) upcoming break, or the multiple audio guidance messages may be distributed over multiple (earliest) upcoming breaks in order not to confuse the user with excessive guidance messages. In the latter case, the audio guidance messages may be prioritized such that an audio guidance message with a greater priority is output in the earlier upcoming break, while an audio guidance message with a lower priority is output in a later upcoming break.

The urgency may be a numerical value that indicates how soon the audio guidance message should be output to the user. For example, an urgency of 72 may indicate that the audio guidance message with said urgency should be output to the user within 72 time units, e.g. seconds. The urgency criterion may be a threshold such that an urgency less than the threshold fulfils the urgency criterion, and an urgency greater than or equal to the threshold does not.

In an embodiment, the urgency is a maximum delay allowed for playback of the audio guidance message. The maximum delay may be a time until the future time instant by which the audio guidance message must be output at the latest. If detecting the event on the basis of the sensor data, the event may have a pre-determined corresponding maximum delay stored e.g. in the memory of the apparatus. In an embodiment, the urgency criterion may be a threshold corresponding to the time until the earliest of the one or more upcoming breaks. If the time until the earliest of the one or more upcoming breaks is greater than the urgency, i.e. the maximum delay allowed for the audio guidance message, the urgency criterion is fulfilled. In this case, the future time instant may be set as immediate. If the time until the earliest of the one or more upcoming breaks is not greater than the urgency, the urgency criterion is not fulfilled. In this case, the earliest of the one or more upcoming breaks may be selected as the future time instant.

In an embodiment, determining the urgency comprises selecting 304 an urgency class for the audio guidance message from a plurality of urgency classes. The selecting may be performed using one or more classification rules. In an embodiment, the plurality of urgency classes comprises two urgency classes: high and low. The urgency class 'high' may fulfil the urgency criterion, and the urgency class 'low' may not fulfil the urgency criterion. Such a classification may simplify computational demands of the method.

Further, if determining the urgency is performed as determining the urgency based on the detected event, the apparatus may select the urgency class based on the detected event using the one or more classification rules, for example. Alternatively or additionally, the detected event may have a pre-determined corresponding urgency class stored e.g. in the memory of the apparatus, that the apparatus may select. Computational demands of the method may thus be reduced further.

In an embodiment, the plurality of urgency classes comprises three urgency classes: high, medium, and low. The urgency class 'medium' may indicate that it is inconclusive whether or not the urgency determined based the contents of the audio guidance message meets the urgency criterion or not, and more information may be needed. Embodiments for finding and using such information to determine whether or not the urgency criterion is fulfilled are described below.

In an embodiment, the method comprises determining said urgency based on user preferences. The user preferences may be stored in the apparatus and/or received by the apparatus e.g. from the cloud server 112. The user preferences may comprise settings and/or rules. The apparatus may apply the user preferences, settings, and/or rules when determining the urgency of the audio guidance message. The user preferences may have default or pre-set values. The user may set the user preferences via a user interface of the apparatus, for example. In this way, the user is able to customize the operation of the apparatus to suit their personal preferences.

In an embodiment, the method comprises: determining 300 a context for the audio guidance message based on at least one of the sensor data, metadata of the exercise session, and metadata of the audio stream; and determining 302 the urgency also based on the context.

The context may provide additional information when determining the urgency in addition to the contents of the audio guidance message. For example, a context determined based on sensor data indicating a high heart rate and/or speed may have a decreasing effect on the urgency, or that the urgency is less likely to meet the urgency criterion than if the urgency were not determined also based on the context. In this example, the high heart rate and/or speed may indicate that the user is training at a high intensity, and may be less likely to pay attention to an audio guidance message if it were output during high intensity training. In another example, the sensor data may reveal that the user has a low heart rate and/or speed, which may indicate that the user is resting. In this case, the context may increase the urgency of the audio guidance message, as the user may be more likely to pay attention to the audio guidance message while resting.

The effect of the context on the urgency may be implemented by a numerical multiplier, for example. Alternatively, in the embodiment with the urgency class 'medium', the additional information provided by the context may be used to (re-)classify, using the one or more classification rules, for example, the audio guidance messages that would have been classified as 'medium' as either 'high' or 'low' urgency. The urgency class 'medium' may thus be considered an intermediate urgency classification.

In an embodiment, if the sensor data is associated with a first context, the urgency of the audio guidance message fulfils the urgency criterion, else if the sensor data is associated with a second context, wherein the second context is different from the first context, the urgency of the audio guidance message does not fulfil the urgency criterion, wherein the first context and the second context are based on at least one of metadata of the exercise session 222 and metadata of the audio stream 224.

The metadata of the exercise session may comprise an exercise type, and a plan for the exercise session, for example. The exercise type may correspond to a sport the user is performing during the exercise session, such as running, cycling, or swimming, for example. The exercise session may be divided into segments in the plan. The segments may have lengths defined in terms of time, distance, or some other length parameter, and they may have defined targets defined in terms of speed, heart rate, and/or some other target parameter proportional to training intensity. The segments may correspond to exercise portions such as warm-up, cool down, various work periods and optionally recovery periods at different exercise zones including a recovery zone, interval training zones, an aerobic training zone, tempo training zones, a lactate threshold zone, an anaerobic training zone, and/or race pace training zones. In such a case, the first context may be that a segment of the exercise session is ongoing. This means that certain sensor data or a certain parameter derived from the sensor data causes the interruption of playing the audio stream. An example is that measured heart rate or speed is outside a heart rate range or speed range planned for the ongoing segment, and such an event may have a high urgency that requires immediate output. Meanwhile, the second context may be that the segment of the exercise session has ended. In such a case, the sensor data may indicate expiry of the segment, e.g. time, distance, or heart rate accumulation planned for the segment has been reached. In such a case, the beginning of the next phase may be synchronized with the next break in the audio stream. This means that the transition to the next segment in the exercise session may be delayed until the next break. The metadata of the audio stream may comprise information related to the audio stream, such as a name, a performer, a content type, length of an audio track, or a description of the audio stream, for example. The metadata may include information related to the breaks in the audio stream, including the one or more upcoming breaks. The information on the one or more upcoming breaks may be used according to the embodiment where the urgency criterion is the maximum delay allowed for the output of the audio guidance, as described above. Some examples of the content type are an audiobook, a music stream, or a radio broadcast. The metadata may include content-type-specific information, such as genre, or tempo as beats per minute (BPM).

Often, users make a personalized playlist for the exercise session. If such a playlist is known beforehand, the plan for the exercise session may be adapted to the metadata of the audio streams of the playlist. In an embodiment, the boundaries of the segments of the exercise session may be adapted to the breaks of the playlist (silent periods between consecutive songs/tracks). For example, if an initial plan for the exercise session includes a warm-up segment of ten minutes and first tracks of the audio stream last ten minutes and 30 seconds, the warm-up segment may be extended to the length of the first tracks. In other words, the boundaries of the segments may be adapted to occur at the timings between consecutive tracks of the audio stream. In this manner, the audio guidance indicating the start of the next segment and any other audio guidance related to that (e.g. target speed and/or heart rate range(s)) is output between the tracks.

In yet another embodiment, the target intensity (target speed and/or heart rate(s)) of at least one segments of the training session is adapted to a tempo of the audio stream played at the time of the particular segment. For example, a high-intensity segment may be allocated to occur at the time where there is a high-tempo audio track or audio tracks. This adaptation may be carried out before starting the exercise session, or the adaptation may be conducted during the exercise session. For example, if the user play a random audio stream, the audio guidance may instruct the user to carry out segments of the exercise session with intensity that matches with the tempo of the audio tracks. Whenever the track changes to a new one with different tempo, the audio guidance may instruct the user to change the training intensity to follow the change in the tempo of the audio stream.

Figures 6, 7:
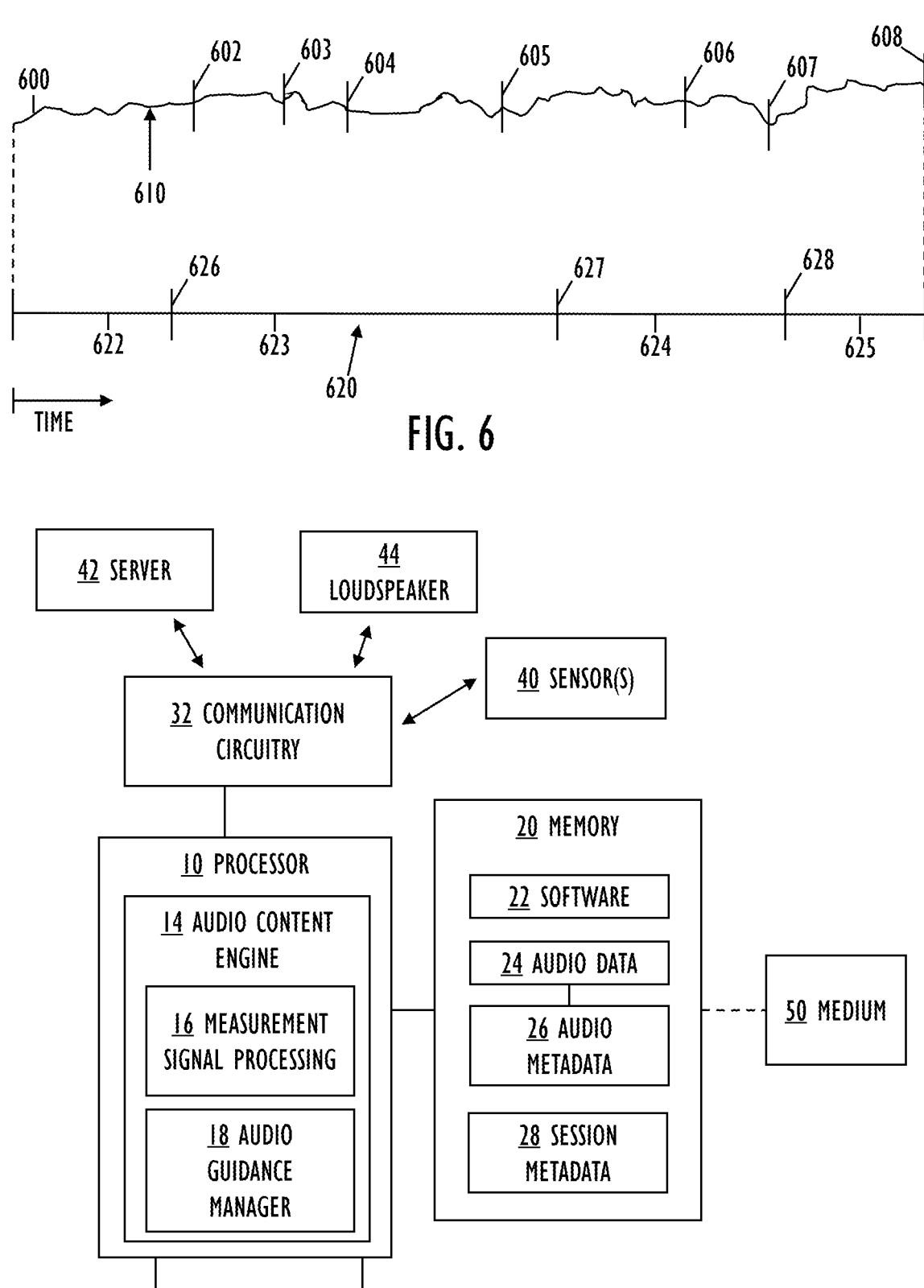
FIG. 6 illustrates examples related to determining a future time instant.
FIG. 7 illustrates embodiments of an apparatus as a block diagram.

FIG. 6 illustrates some examples related to determining the future time instant. Time increases from left to right in FIG. 6, and an audio stream 600 is illustrated. Let us now consider time instant 610 near the beginning of the audio stream 600. Sensor data is received and an audio guidance message is generated based on the sensor data at, or some time before, the time instant 610. The future playing period of the audio stream may begin from time instant 610 and end at some other time instant following time instant 610, such as one of time instants 602-608, for example. Determining the future time instant may comprise selecting one of time instants 602-608, 610 during the future playing period of the audio stream as the future time instant.

Time instants 602-608 may also represent breaks in the audio stream, and time instant 608 may also represent the end of the audio stream. Again, considering the time instant 610, if the urgency of the audio guidance message fulfils the urgency criterion, the future time instant may be set as immediate by selecting the time instant 610 as the future time instant. If the urgency of the audio guidance message does not fulfil the urgency criterion, the metadata of the audio stream may be analyzed to detect the one or more upcoming breaks 602-608 in the future playing period of the audio stream. The breaks 602-608 may be explicitly represented in the metadata of the audio stream, or they may be derived by the apparatus from the metadata of the audio stream. One of the one or more upcoming breaks 608 may be set as the future time instant by selecting one of the time instants 602-608 as the future time instant. In an embodiment, the earliest of the one or more upcoming breaks, that is, time instant 602, is set as the future time instant.

FIG. 6 also illustrates a plan 620 for the exercise session. In FIG. 6, the plan is time-synchronized to the audio stream as indicated by the dashed lines. The plan comprises four timed segments 622-625, with transitions 626-628 in between the segments. Segment 622 may represent a warm-up, segment 623 a first work period at a lactate threshold zone, segment 624 a second work period at an anaerobic training zone, and segment 625 a cool down, for example. The particular segments and zones are exemplary and typically vary for different plans.

Considering again the time instant 610, a context may be determined based on the metadata of the exercise session. For example, the metadata of the exercise session may indicate that at time instant 610, segment 622 of the plan 620 representing the warm-up is ongoing, indicating that the user is performing or is supposed to be performing the warm-up of the exercise session. The time instant of the transition 626 from the warm-up to the first work period may also be included in the metadata. Based on one or more of the above pieces of information found in the metadata of the exercise session, the context, and consequently the urgency, of the audio guidance message may be determined. For example, the fact that the warm-up is ongoing may increase the urgency of the audio guidance message, as the warm-up may be intended to be performed at a relatively low intensity and it is usually at the beginning of the exercise session, which means that the user may be well prepared to receive the audio guidance message. Further, the time between the time instant 610 and the upcoming transition 626 may affect the context and thus the urgency. The length of a time interval between the time instant 610 and the upcoming transition 626 may increase or decrease the urgency. The effect on the context and urgency may depend on the one or more classification rules, for example.

The context and/or urgency may be determined based on the metadata of the audio stream 600. For example, the time between the time instant 610 and one of the one or more upcoming breaks, in this case the earliest upcoming break 602, may have an effect on the context and/or the urgency. Other information stored in the metadata of the audio stream, such as tempo or genre, may be used in the determining.

In an embodiment, the method comprises generating the audio guidance message based also on at least one of metadata of the exercise session and metadata of the audio stream. The above-described event may be detected also on the basis of at least one of metadata of the exercise session and metadata of the audio stream. A first part of the audio guidance message may be generated based on the sensor data, and a second part of the audio guidance message may be generated based on at least one of metadata of the exercise session and metadata of the audio stream. The audio guidance message or the second part of the audio guidance message, when generated based on the metadata of the exercise session, may contain instructions related to performing the exercise session, for example. The audio guidance message or the second part of the audio guidance message, when generated based on the metadata of the audio stream, may contain information related to the audio stream, such as the length of a track or the name of a song that was played or is about to be played on the audio stream. Alternatively or additionally, the apparatus may combine or aggregate the sensor data, the metadata of the exercise session, and/or the metadata of the audio stream when generating the audio guidance message. For example, the apparatus may generate the audio guidance message based on a target heart rate of the exercise session (from the metadata of the exercise session), and the heart rate of the user measured by the one or more sensors (from the sensor data) during the length of a track (from the metadata of the audio stream). The audio guidance message of the above example may indicate that the average heart rate of the user during the length of the track was below or above the target heart rate, for example. Detecting the event of the user's heart rate exceeding/subceeding the target heart rate during the length of the track may trigger generating the audio guidance message. The audio guidance message may thus provide other, possibly aggregated information in addition to information based solely on the sensor data.

Let us consider a scenario wherein the apparatus is configured to output an audio guidance message after each track played on the audio stream. The audio guidance message may contain information related to an average, maximum, and/or minimum speed and/or heart rate, or a distance travelled by the user during each track, for example. A track may refer to a song or an audiobook chapter, for example. In an embodiment, the method comprises receiving sensor data measured by the one or more sensors during the playing of a track on the audio stream. The method may further comprise computing a derived parameter based on the sensor data, and generating the audio guidance message based on the derived parameter. The method may further comprise setting the end of the track as the future time instant. The derived parameter may a sum, an average, a minimum, and/or maximum computed from the sensor data, for example.

Referring back to FIG. 6, let us consider the time instants 602-608 as ends of tracks played on the audio stream, and let us concentrate specifically on a track represented by a time interval from 603 to 604 on the audio stream. The track begins at 603, where the previous track also ends, and ends at 604, after which the next track begins. Sensor data is measured by the one or more sensors during the playing of the track on the audio stream, i.e. during the time interval from 603 to 604. The sensor data may be measured for the (whole) duration of the track, or for a part of the duration of the track; preferably the sensor data measured during a part of the track is representative of the sensor data measured during the whole track. The sensor data is received by the apparatus and the apparatus computes a derived parameter, such as average heart rate, based on the sensor data. The audio guidance message is generated based on the derived parameter, which in this example is the average heart rate. The audio guidance message may be generated such that the audio guidance message comprises the derived parameter. As the future time instant is set at the end of the track, the audio stream may be interrupted and the audio guidance message output to the user right after the track ends. The above may be repeated for each track played on the audio stream so that an audio guidance message is output after each track at time instants 602-608. In other words, the user's performance during the playing of the track may be collated and a summary of the performance may be output at the end of the track as the audio guidance and in the form of the derived parameter(s). As described above, examples are an average heart rate and/or average speed during the playing of the track, a maximum heart rate and/or maximum speed during the playing of the audio track, etc.

A benefit is that the user may receive audio guidance messages based on the sensor data at somewhat regular intervals. Further, as the audio guidance message is output at the end of a track, inconvenient interruptions of the audio stream mid-track may be reduced or avoided altogether.

Depending on the characteristics of the sensor data, computing the derived parameter may be also based on the metadata of the audio stream. For example, if the sensor data is location data comprising an array of location data values with no time information, the duration of the track from the metadata of the audio stream may be used to compute the average speed of the user. However, in other scenarios, it may not be necessary to augment the sensor data with the metadata of the audio stream when computing the derived parameter.

Referring again to FIG. 6, let us again consider an audio guidance message generated at time instant 610. The audio guidance message may contain instructions related to the transition 626 from segment 622 to segment 623 of the exercise session plan 620. The audio guidance message may contain instructions that inform the user that the warm-up (segment 622) is about to end, and/or that the first work period at a lactate threshold zone (segment 623) is about to begin, for example. The apparatus may output the audio guidance message at the same time as the transition 626. Alternatively, the apparatus may output the audio guidance message at a time instant that is a determined time interval before the transition 626, or a determined time interval after the transition 626. The apparatus may select one of the one or more upcoming breaks 602-608, such as the time instant corresponding to break 602 as the future time instant for outputting the audio guidance message the user.

Regarding the above example, it is noted that from the user's point of view, the warm-up period may seem to have its end extended from the time of the transition 626 as provided in the exercise session plan, until the time of break 602. Whether such an extension is allowable may be determined by evaluating the time between the transition in the session plan, and the time of the break, of the one or more upcoming breaks, that is closest in time to the transition. The metadata of the exercise session may comprise limits for changing the lengths of the segments and/or the times of the transitions. Determining the future time instant may be performed using said limits.

In an embodiment, the audio guidance message comprises verbal information. The verbal information may comprise recorded human speech and/or machine-generated speech. Alternatively or additionally, the audio guidance message may comprise non-verbal information. The non-verbal information may include audible signals, tones, and/or beeps, for example.

In an embodiment, the audio guidance message comprises, at its beginning and/or end, audio content with audio characteristics that differ from audio characteristics of the audio stream at or near the time of the interrupting. The effective change in audio characteristics as heard by the user may signal to the user that the audio guidance message is about to begin or end. The audio characteristics may be related to the spectra of the audio guidance message and the audio stream, for example. As an example, the audio stream may be an audiobook, and the audio characteristics of the audio stream may reflect e.g. the spectral characteristics of the audiobook. The audio guidance message may begin and/or end with a sinusoidal beep, for example, or with another notification sound distinguishing from the audio characteristics of the audio stream. The audio characteristics of the audio content at the beginning and/or end of the audio guidance message may reflect the spectral characteristics of the sinusoidal beep, for example. In this example, the audio or spectral characteristics of the audiobook and the sinusoidal beep are different from each other. Alternatively or additionally, the audio content at the beginning and/or end of the audio guidance message may comprise a period of silence.

In an embodiment, the method comprises updating 212 the audio guidance message after determining the future time instant for outputting the audio guidance message. Referring back to FIG. 6 and the above example, the audio guidance message related to the transition 626 may contain the verbal statement "Coming up: work period at lactate threshold zone for 20 minutes". As noted above, after determining the future time instant that corresponds to break

602, the length of the warm-up may have increased from the user's point of view. Let us assume that at the time of updating the audio guidance message, the time of transition 627 is fixed. Due to the perceived increase in length of the warm-up segment 622, the length of the first work segment 623 may decrease. Considering that the time between 626 and 602 is 2 minutes, for example, updating the audio guidance message may comprise updating the verbal statement contained in the message to: "Coming up: work period at lactate threshold zone for 18 minutes". The audio guidance message is thus updated to match the perceived length of the upcoming segment, avoiding providing misleading information to the user.

In an embodiment, the one or more sensors comprise a global navigation satellite system receiver to receive global navigation satellite system signals and generate positioning data of the apparatus based on the global navigation satellite system signals, wherein the sensor data comprises the positioning data of the apparatus, and wherein the one or more processors cause performance of at least the following: generating the audio guidance message based on the positioning data of the apparatus. The global navigation satellite system signals may be received from navigational satellites such as satellite 114 of FIG. 1. The signals received by the apparatus may be received by the wrist device 108 or the portable electronic device 110, for example.

Some embodiments related to generating the audio guidance message based on the positioning data of the apparatus are illustrated in FIGS. 4 and 5.

In an embodiment, the method comprises: detecting 400 a number of global navigation satellite system signals within a detection time period; and if the number of global navigation satellite system signals within the detection time period is less than a signal number threshold, performing 402 said generating the audio guidance message such that the audio guidance message comprises an indication of a lack of the global navigation satellite system signals. The apparatus may detect the event of the lack of the global navigation satellite system signals. Else if the number of global navigation satellite system signals within the detection time period is greater than or equal to the signal number threshold, said generating the audio guidance message based on the positioning data of the apparatus may be performed normally as described above. The signal number threshold and the length of the detection time period may be varied, either together or separately. For example, the signal number threshold may be 0, 1, 2, or 3 for a short detection time period, such as 10 seconds. As another example, the signal number threshold may be 4 or greater for a time period longer than 10 seconds. A GPS (Global Positioning System) receiver requires signals from at least four GPS satellites. A lack of GNSS signals may thus be communicated to the user, and the user may attempt to correct it e.g. by moving to an area with fewer obstructions that may block the line of sight for the signals or otherwise exposing the GNSS receiver to the GNSS signals. However, due to the signal number threshold and the detection time period, the apparatus does not necessarily bother the user with very short periods of time during which the signals are lost and possibly quickly recovered after.

In an embodiment, the method comprises computing 500 a route from a first location of the user to a second location; generating 502 navigation instructions for the user to follow the route to the second location based on the positioning data of the apparatus; and performing 504 said generating the audio guidance message such that the audio guidance message comprises the navigation instructions. The apparatus may detect the event that the user arrives at an intermediate location along or off the computed route, and generate the navigation instructions and the audio guidance message accordingly so that by following the instructions, the user may follow the route to the second location.

The urgency of the audio guidance message comprising the navigation instructions may vary depending on the navigation instructions. For example, acute instructions to take a turn or change direction may be urgent. However, instructions to follow a road for a relatively long period of time or distance, such as several minutes or kilometers, may not be urgent. The urgency may depend on the sensor data, such as the average or instantaneous speed of the user.

In an embodiment, the apparatus comprises at least one battery, wherein the one or more sensors comprise at least one battery sensor to measure a charge level of the at least one battery, and wherein the one or more processors cause performance of at least the following: if the charge level of the at least one battery is lower than a battery level threshold, generating the audio guidance message based on the charge level of the at least one battery. The at least one battery may include batteries of the headphones 102, the heart rate monitor belt 106, the wrist device 108, and/or the portable device 110, for example. A benefit is that the event of a low charge level may be communicated to the user as a low battery warning, for example.

Alternatively or additionally, the apparatus may comprise at least one battery sensor configured to measure a charge level of at least one external battery. The at least one external battery may be e.g. the battery of an electronic gear-shifter of a bike.

In an embodiment, the method comprises: generating a battery consumption estimate for the exercise session; and setting the battery level threshold based on the battery consumption estimate. The battery level threshold may be set to the battery consumption estimate, or slightly above the estimate, to allow for a margin of error in the estimate.

The battery consumption estimate may be a crude estimate based on a general principle, such as a fixed estimate of 20% battery consumption for the exercise session, for example. Generating the battery consumption estimate may be based on the elapsed duration of the exercise session and/or the expected total and/or remaining duration of the exercise. The elapsed, remaining and total duration of the exercise session may be provided in the metadata of the exercise session. Sensor data, including but not limited to previous charge level data, may be used in generating the battery consumption estimate.

The urgency of the audio guidance message based on the charge level may also depend on the metadata of the exercise session, such as the elapsed, remaining and total duration of the exercise session. For example, a low battery may be urgent at the beginning of the exercise session, but not as urgent at the end of the exercise session. The apparatus may estimate a remaining battery level of the at least one battery, and compare the remaining battery level to the remaining duration of the exercise session. The remaining battery level may be estimated in units of time to facilitate the comparison to the remaining duration of the exercise session. If the remaining duration of the exercise session is greater than the remaining battery level, the future time instant for outputting the audio guidance message is set as immediate. A very low charge level, such as 1%, may however always be urgent.

In an embodiment, the apparatus may support multiple audio guidance playback modes and select an audio guidance playback mode for the exercise session amongst at least the following:

a first playback mode where the output of the audio guidance message and other audio guidance messages is based on said determined urgency defining whether to interrupt the playing of the audio stream or to wait for said one or more upcoming breaks in the future playing period of the audio stream; and a second playback mode where the output of the audio guidance message and other audio guidance messages interrupts the playing of the audio stream without determining said urgency of the audio guidance message.

The first playback mode follows any one of the above-described embodiments where the apparatus determines the urgency and the output timing on the basis of the urgency of the audio guidance message. In the second playback mode, the audio guidance messages may always interrupt the playing of the audio stream without the consideration of the urgency. The user may select which playback mode to follow, and the apparatus may assume the appropriate playback mode on the basis of the user input.

The number of different types of audio guidance output messages may be larger in the second playback mode, while a more limited set of different types of audio guidance messages may be output in the first playback mode. For example, an audio guidance message output in the second playback mode but not in the first playback mode may include at least one of the following: exercise session started, navigation instructions, exercise session ended, exercise session summary, exercise on hold. Audio guidance message types output in both playback modes may include at least one of the following: a critical alarm such as sensor disconnection, exercise session guidance per segment, training intensity guidance, exercise segment feedback (e.g. average heart rate or speed during a past segment).

FIG. 7 illustrates embodiments of an apparatus as a block diagram, comprising a processing system configured to perform the method of FIG. 2 or any one of the embodiments thereof described above. Referring to FIG. 1, the apparatus may comprise the wrist device 108, the portable electronic device 110, the cloud server 112, the heart rate monitor belt 106, and/or the headphones 102. The processing system may comprise at least one processor 10 and at least one memory 20. The apparatus may further comprise a user interface comprising a display screen or another display unit, an input device such as one or more buttons and/or a touch-sensitive surface, and an audio output device such as a loudspeaker 34, 44. In some embodiments, the user interface comprises a haptic output device configured to provide haptic indications to the user 100. In the case of the apparatus comprising the cloud server 112, the user interface may be provided via a client device such as the portable device 110 communicating with the server.

The processor 10 may comprise an audio content engine 14 configured to manage the audio provided to the user by controlling the procedure of FIG. 2 or any one of the embodiments thereof. The audio content engine 14 may comprise a measurement signal processing circuitry 16 configured to acquire the sensor data for the purposes of generating the audio guidance message(s). The circuitry 16 may control the one or more sensors 30, 40, including one or more integrated sensors 30 and/or one or more distributed sensors 40 to carry out the measurements and collect the sensor data from the one or more sensors. The one or more integrated sensors may be comprised in the same physical device as the processor 10 and/or coupled to the processor 10 with direct electrical connections. The one or more distributed sensors may be communicatively coupled to the processor 10 via communication circuitry 32, for example. The audio content engine 14 may further comprise an audio guidance manager 18 configured to generate the audio guidance message(s) according to the principles described above and on the basis of the sensor data acquired by the circuitry 16.

The audio content engine 14 may further control the playing, interrupting, and other functions related the audio stream 104. The audio content engine may control the loudspeaker 34, 44 for the purposes of playing the audio stream and outputting the audio guidance message(s). The loudspeaker may comprise an integrated loudspeaker 34 comprised in the same physical device as the processor 10 and/or coupled to the processor 10 with direct electrical connections, and/or a distributed loudspeaker communicatively coupled to the processor 10 via communication circuitry 32, for example. The audio content engine may retrieve audio data 24 and/or audio metadata 26 from memory 20. Additionally or alternatively, the audio content engine may receive audio data and audio metadata from server 42, such as the cloud server 112, via communication circuitry 32.

The apparatus may comprise a communication circuitry 32 connected to the processor 10. The communication circuitry may comprise hardware and software suitable for supporting Bluetooth® communication protocol such as Bluetooth Smart specifications. It should be appreciated that other communication protocols are equivalent solutions as long as they are suitable for establishing a personal area network (PAN) with the distributed sensors 40 and/or the distributed loudspeaker 44, or suitable for scenarios described in this document. When, the apparatus comprises the wrist device 108 or the portable device 110, the communication circuitry may comprise a radio modem and appropriate radio circuitries for establishing a communication connection with the other devices, e.g. server 42, 112, the wrist device 108, or the portable device 110, depending on the implementation of the apparatus. Suitable radio protocols may include IEEE 802.11-based protocols or cellular communication protocols. In case the apparatus is the server 112, the communication circuitry 32 may comprise one or more computer network circuits operating, for example, according to Ethernet protocol. The processor 10 may use the communication circuitry 32 to transmit and receive frames or data according to the supported wireless communication protocol. The frames may carry a payload data comprising the above-described sensor data measured by the one or more sensors 30, 40, and/or data between the devices 108, 110, 112. The payload data may comprise the audio data and/or metadata of the audio stream, and/or session metadata of the exercise session.

The memory 20 may store a computer program product 22 defining the computer program instructions for carrying out the method of FIG. 2 or any one of the embodiments thereof. The memory may store audio data 24 and/or metadata 26 of the audio stream 104, and/or session metadata 28 of the exercise session. The memory may further store a user profile of the user 100 storing personal characteristics of the user 100, e.g. age, weight, the fitness level, etc., and/or the user preferences that may be related to the operation of the apparatus. The memory may further store a database comprising the sensor data received during the exercise session.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network de-vice, or another network device.

In an embodiment, at least some of the processes described in connection with FIGS. 2 to 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, and circuitry. In an embodiment, the at least one processor, the memory, and the computer program code form processing means or comprises one or more computer program code portions for carrying out one or more operations according to any one of the embodiments of FIGS. 2 to 5 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 5 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium 50 readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described with reference to one or more embodiments according to the accompanying drawings, it is clear that the invention is not restricted thereto but may be modified in several ways within the scope of the appended claims. All words and expressions should be interpreted broadly, and they are intended to illustrate, not to restrict, the embodiments. It will be obvious to a person skilled in the art that, as technology advances, the inventive concept may be implemented in various ways.

What is claimed is:

1. An apparatus comprising:
   one or more sensors to measure sensor data related to an exercise session of a user;
   a loudspeaker; and
   one or more processors to cause performance of operations comprising:
   receiving the sensor data measured during the exercise session from the one or more sensors;
   playing an audio stream via the loudspeaker to the user during the exercise session;
   generating an audio guidance message based on the sensor data and on at least one of metadata of the exercise session and metadata of the audio stream, wherein a first part of the audio guidance message is based on the sensor data, and a second part of the audio guidance message is based on at least one of metadata of the exercise session and metadata of the audio stream;
   determining an urgency for the audio guidance message based on the contents of the audio guidance message; and
   if the urgency of the audio guidance message fulfils an urgency criterion, interrupting the playing of the audio stream and outputting the audio guidance message via the loudspeaker to the user;
   else if the urgency of the audio guidance message does not fulfil the urgency criterion, analyzing metadata of the audio stream to detect one or more upcoming breaks in a future playing period of the audio stream, and outputting the audio guidance message via the loudspeaker to the user in the one or more upcoming breaks.

2. The apparatus of claim 1, wherein the one or more processors are configured to delay, after said determining that the urgency of the audio guidance message does not fulfil the urgency criterion, said outputting the audio guidance message and to allow playback of the audio stream during said delay.

3. The apparatus of claim 1, wherein the urgency is defined by a maximum delay allowed for playback of the audio guidance message.

4. The apparatus of claim 3, wherein determining the urgency comprises selecting an urgency class for the audio guidance message from a plurality of urgency classes.

5. The apparatus of claim 1, wherein the received sensor data has been measured by the one or more sensors during playing of a track of the audio stream, and wherein the one or more processors are configured to compute a derived parameter based on the sensor data measured during the playing of the track, and to generate the audio guidance message based on the derived parameter, and to output the derived parameter at the end of the track.

6. The apparatus of claim 1, wherein the one or more processors cause performance of operations comprising:

determining a context for the audio guidance message based on at least one of the sensor data and metadata of the exercise session; and determining the urgency also based on the context.

7. The apparatus of claim 6, wherein, if the sensor data is associated with a first context, the urgency of the audio guidance message fulfils the urgency criterion, else if the sensor data is associated with a second context, wherein the second context is different from the first context, the urgency of the audio guidance message does not fulfil the urgency criterion, wherein the first context and the second context are based on metadata of the exercise session.

8. The apparatus of claim 7, wherein the exercise session is divided into segments having a length defined in terms of time, distance, or another length parameter, wherein the first context is that a segment of the exercise session is ongoing, and wherein the second context is that the segment of the exercise session has ended.

9. The apparatus of claim 1, wherein the one or more processors cause performance of operations comprising:

determining a context for the audio guidance message based on metadata of the audio stream; and determining the urgency also based on the context.

10. The apparatus of claim 1, wherein the urgency is defined by a maximum delay allowed for playback of the audio guidance message and wherein the one or more processors cause performance of operations comprising:

determining a context for the audio guidance message based on metadata of the audio stream; and determining the urgency also based on the context, wherein the metadata of the audio stream comprises information on one or more upcoming breaks in the audio stream, and wherein the one or more processors are configured to perform operations comprising:

if a time until the earliest of the one or more upcoming breaks is greater than the maximum delay, determining that the urgency criterion is fulfilled, else if the time until the earliest of the one or more upcoming breaks is not greater than the maximum delay, determining that the urgency criterion is not fulfilled.

11. The apparatus of claim 9, wherein the context for the audio guidance message based on metadata of the audio stream is a length of an audio track of the audio stream.

12. The apparatus of claim 1, wherein the audio guidance message comprises verbal information.

13. The apparatus of claim 1, wherein the one or more processors cause performance of operations comprising:

updating the audio guidance message after determining the future time instant for outputting the audio guidance message.

14. The apparatus of claim 1, wherein the one or more sensors comprise a global navigation satellite system receiver to receive global navigation satellite system signals and generate positioning data of the apparatus based on the global navigation satellite system signals, wherein the sensor data comprises the positioning data of the apparatus, and wherein the one or more processors cause performance of operations comprising:

generating the audio guidance message based on the positioning data of the apparatus.

15. The apparatus of claim 14, wherein the one or more processors cause performance of operations comprising:

detecting a number of global navigation satellite system signals within a detection time period; and if the number of global navigation satellite system signals within the detection time period is less than a signal number threshold, performing said generating the audio guidance message such that the audio guidance message comprises an indication of a lack of the global navigation satellite system signals.

16. The apparatus of claim 14, wherein the one or more processors cause performance of operations comprising:

computing a route from a first location of the user to a second location;

generating navigation instructions for the user to follow the route to the second location based on the positioning data of the apparatus; and performing said generating the audio guidance message such that the audio guidance message comprises the navigation instructions.

17. A method comprising:

receiving sensor data measured during an exercise session of a user from one or more sensors;

playing an audio stream via a loudspeaker to the user during the exercise session;

generating an audio guidance message based on the sensor data; and on at least one of metadata of the exercise session and metadata of the audio stream, wherein a first part of the audio guidance message is based on the sensor data, and a second part of the audio guidance message is based on at least one of metadata of the exercise session and metadata of the audio stream;

determining an urgency for the audio guidance message based on the contents of the audio guidance message; and if the urgency of the audio guidance message fulfils an urgency criterion, interrupting the playing of the audio stream and outputting the audio guidance message via the loudspeaker to the user, else if the urgency of the audio guidance message does not fulfil the urgency criterion, analyzing metadata of the audio stream to detect one or more upcoming breaks in a future playing period of the audio stream, and outputting the audio guidance message via the loudspeaker to the user in the one or more upcoming breaks.

18. A computer program product comprising instructions embodied on a non-transitory medium which, when the program is executed by a computer, cause the computer to carry out a method comprising:

receiving sensor data measured during an exercise session of a user from one or more sensors;

playing an audio stream via a loudspeaker to the user during the exercise session;

generating an audio guidance message based on the sensor data and on at least one of metadata of the exercise session and metadata of the audio stream, wherein a first part of the audio guidance message is based on the sensor data, and a second part of the audio guidance message is based on at least one of metadata of the exercise session and metadata of the audio stream;

determining an urgency for the audio guidance message based on the contents of the audio guidance message; and if the urgency of the audio guidance message fulfils an urgency criterion, interrupting the playing of the audio stream at the future time instant and outputting the audio guidance message via the loudspeaker to the user, else if the urgency of the audio guidance message does not fulfil the urgency criterion, analyzing metadata of the audio stream to detect one or more upcoming breaks in a future playing period of the audio stream, and outputting the audio guidance message via the loudspeaker to the user in the one or more upcoming breaks.

\* \* \* \* \*